United States Patent [19]

Juncal

[11] Patent Number: 4,828,642

[45] Date of Patent: May 9, 1989

[54] PROCESS FOR THE MANUFACTURE OF PARQUET FLOORING BLOCKS

[76] Inventor: Hector O. Juncal, Bruselas, 1161, (1408)-Buenos Aires, Argentina

[21] Appl. No.: 98,728

[22] Filed: Sep. 15, 1987

Related U.S. Application Data

[63] Continuation of Ser. No. 756,021, Jul. 17, 1985, abandoned.

[30] Foreign Application Priority Data

Jul. 20, 1984 [ES] Spain .................................... 534524

[51] Int. Cl.$^4$ ................................................ B32B 1/00

[52] U.S. Cl. ..................................... 156/268; 83/139; 83/880; 144/346; 144/350

[58] Field of Search ............... 156/250, 268, 256, 251; 144/344–346, 350–312; 83/142, 465, 880, 31, 51, 869, 139

[56] References Cited

U.S. PATENT DOCUMENTS

| | | | |
|---|---|---|---|
| 1,394,120 | 10/1921 | Rockwell | 144/350 |
| 1,963,393 | 6/1934 | Woodall | 156/257 X |
| 2,141,121 | 12/1938 | Attwood | 83/880 |
| 3,025,206 | 3/1962 | Scholl | 156/267 X |
| 3,212,542 | 10/1965 | Miller et al. | 156/94 X |
| 3,554,065 | 1/1971 | Kunz | 83/465 X |

*Primary Examiner*—David Simmons
*Attorney, Agent, or Firm*—Ladas & Parry

[57] ABSTRACT

The present invention refers to a process for the manufacture of parquet flooring blocks. The process of the present invention specifically consists in obtaining blocks having any geometrical configuration by stamping a board comprised of a uniform agglomerate base, such as sawdust, vegetal fibers and the like, on which board is disposed a decorative sheet protected by a plastified layer.

2 Claims, 1 Drawing Sheet

PROCESS FOR THE MANUFACTURE OF PARQUET FLOORING BLOCKS

Figure 1:
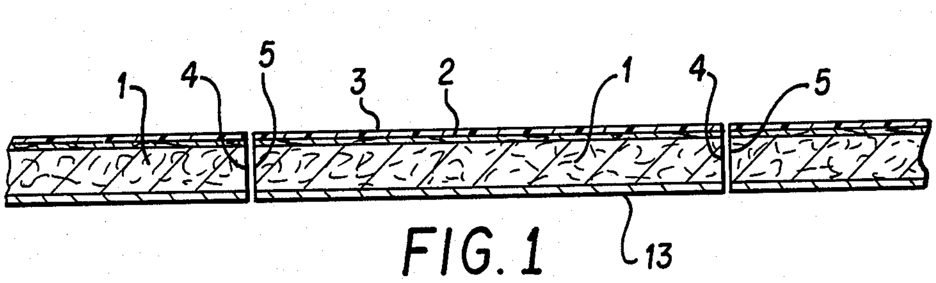

This is a continuation of co-pending application Ser. No. 756,021, filed on July 17, 1985, now abandoned.

The present invention refers to a process for the manufacture of parquet flooring blocks. The process of the present invention specifically consists in obtaining blocks having any geometrical configuration by stamping a board comprised of a uniform agglomerate base, such as sawdust, vegetal fibres and the like, on which board is disposed a decorative sheet protected by a plastified layer.

Parquet flooring blocks comprised of an agglomerate base of sawdust, vegetal fibres or the like, whose decorative layer is placed on one of the faces of the block after it has been stamped from the board, that is the finishing operation of the top surface takes place after the cutting operation has been carried out, are known. These blocks are of the type disclosed by Metzler in British Pat. No. 293,700, by Maury in Swiss Pat. No. 155,360 and by Perstorp in U.S. Pat. No. 1,071,527.

Likewise, there are known methods of stamping panels to produce blocks by means of knife-edge design-formed cutters which proportion blocks with perfectly interengageable edges to form a flooring assembly. This type of cutting method is disclosed by Sheldon in British Pat. No. 811,614. These cutting methods are also carried out on the boards prior to the arrangement of the decorative sheet, since if cutting takes place after the decōrative sheet has been arranged, the edges will not be perfect and will have splinters, having a negative effect during coupling of the various blocks.

Likewise, there are known die-cutting processes in which cutting takes place by knives having a determined geometrical shape. But in this case too diecutting takes place before the decorative sheet is arranged on the board comprised of sawdust, vegetal fibre agglomerates and the like. This type of cutting dies for producing blocks are disclosed by Schneegass in German Pat. No. 156,135.

The object of the present invention is to provide a process for manufacturing parquet flooring blocks in which die cutting takes place once a splinterable decorative sheet has already been arranged on the hardboard. Thus, the decorative sheet, protected by a plastified layer, is arranged on one of the surfaces of the hardboard. Die-cutting takes place with knives having a determined design, said knives initiating the cutting operation at the face of the hardboard not provided with the decorative layer which, along with its plastified protective layer, will be disposed on the base of the die, so that the decorative sheet and the plastified sheet will be cut lastly, after the successive cutting of the hardboard has take place. In this manner, the knives will not produce splinters or chafings on the plastified surface and specifically on the already cut edges of the plastified layer, the decorative sheet and the portion of the already cut hardboard forming the block. Another characteristic of the invention consists in that during the die cutting operation, there are produced on the face of the hardboard, opposite to that on which the decorative sheet and the protective layer are arranged, cut-outs made by punching elements, which cut-outs constitute antisliding means on the corresponding face of the hardboard, aiding in a better fixing of the assembly to the surface to be covered.

The present specification is accompanied by a set of drawings, wherein:

FIG. 1 illustrates a cross-sectional view of a series of blocks made in accordance with the invention.

Figure 2:
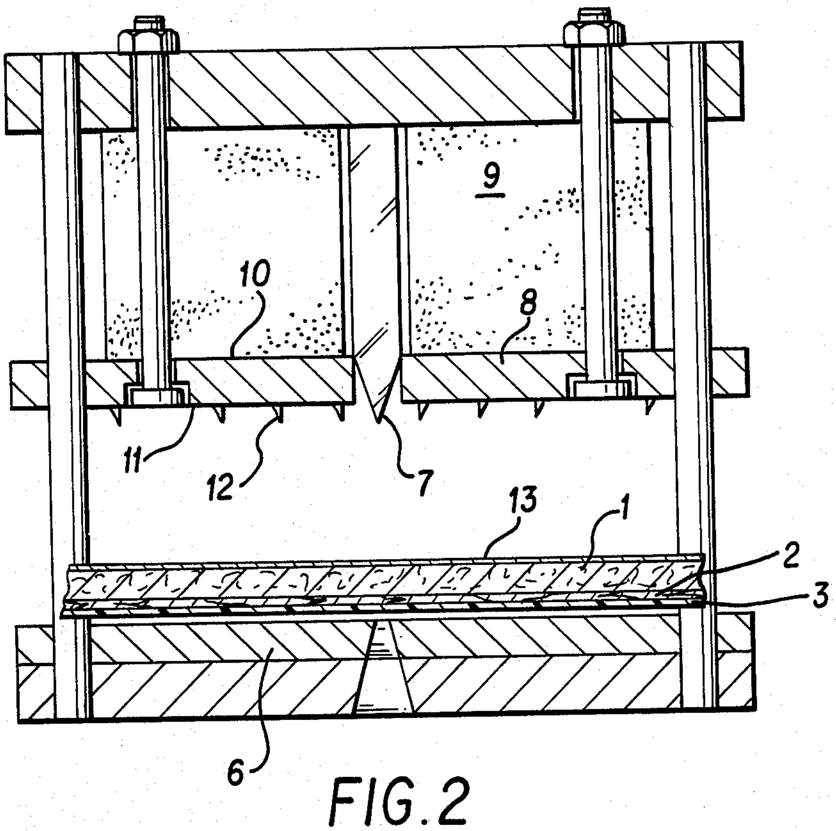

FIG. 2 corresponds to a sectional view of the die for cutting the boards and obtaining the corresponding blocks.

The process of the present invention utilizes hardboard, i.e. agglomerate, 1 made of sawdust, vegetal fibres or the like, disposing on one face thereof a firmly secured, i.e. adhered, decorative sheet 2.

The board 1 and decorative sheet 2 assembly thus obtained is subjected to the following operative steps:

1. Covering the decorative sheet 2 with a transparent, impermeable, wear-resistant, plastic layer 3.

2. Arranging the assembly thus obtained on a die table 6, the layer 3 resting on the surface of the mentioned table 6.

3. Successive stamping of the assembly, using a cutting tool, whose knife 7 adopts any linear configuration or has a geometrical contour.

In this stamping phase, the knife 7 is guided together with a press plate 8 provided with damping means 9 on its inner face 10. The outer face 11 of the plate 8 furthermore has punching elements determining on the free face of the hardboard 1, anti-sliding means for enhancing adaptation of the blocks obtained to the surface to be covered.

The surface of the hardboard 1, opposite to that of the decorative layer 2, can bear a protective layer 13 which can be removed at the time of fixing to the surface to be covered. Therefore, the cuts of the punching elements 12 of the press plate 8 are made on this protective layer 13.

The knife 7 having a linear configuration or a geometrical contour produces at the edges 4 and 5 of the blocks obtained, perfectly interengageable configurations, which configurations can adopt any geometrical shape which permits a perfect coupling between the blocks obtained.

The knife 7, which initiated cutting at the hardboard 1, ends by cutting the decorative sheet 2 and the protective layer 3, wherefore no imperfection is produced in the finish of the cut, such as for example, the splinters which were produced when the cut was in principle made on the decorative sheet.

This process proportions blocks produced by cutting a hardboard on which the decorative sheet and the protective layer have previously been arranged, obtaining the advantage that the material to be cut has been made from a large-sized board, and the blocks are only and exclusively produced by die cutting, thereby obtaining substantial advantages as compared with prior art, in which the decorative sheet had to be arranged on the hardboard after die cutting had taken place, to prevent imperfections due to splinters.

This new process offers substantial advantages, insofar as economy and finish, since the decorative sheet is arranged on a large-sized board and not on small blocks, apart from the fact that the contours thereof have any geometrical configuration to enable them to be coupled to other similar blocks, and besides said contours do not have any imperfections due to splinters which could have been produced by the cut, due precisely to the special inverted positioning of the hardboard and decorative sheet assembly in the die.

I claim:

1. A process of manufacturing a parquet flooring block of any geometrical configuration, comprising:

placing a splinterable decorative sheet having a uniform agglomerate base comprising sawdust, vegetal fibers or the like secured on one side and a transparent, wear-resistant plastic layer covering the opposite side on a die table with the plastic layer resting on the die table; and pressing a knife on one side of a press plate through the former, from the uniform agglomerate base toward the plastic layer on the die table, with a press having means for guiding and damping the pressing, the knife having a linear geometrical configuration of a parquet flooring block.

2. The process of claim 1, wherein the means for damping the pressing are on the opposite side of the press plate from the knife.

* * * * *

UNITED STATES PATENT AND TRADEMARK OFFICE

CERTIFICATE OF CORRECTION

PATENT NO. : 4,828,642

DATED : May 9, 1989

INVENTOR(S) : Hector Otero Juncal

It is certified that error appears in the above-identified patent and that said Letters Patent is hereby corrected as shown below:

Title Page, Item [76] Inventor, "O." should be -- Otero --.

Item (19), "Juncal" should read --Otero Juncal--.

Signed and Sealed this

Twenty-seventh Day of March, 1990

*Attest:*

JEFFREY M. SAMUELS

*Attesting Officer*

*Acting Commissioner of Patents and Trademarks*